Dec. 19, 1967  E. A. MALICK ET AL  3,358,464
CONCENTRATION OF AQUEOUS SOLUTIONS
Filed April 30, 1962

INVENTORS.
E. A. MALICK
G. H. DALE
BY *Young + Quigg*

ATTORNEYS

United States Patent Office 3,358,464
Patented Dec. 19, 1967

3,358,464
CONCENTRATION OF AQUEOUS SOLUTIONS
Emil A. Malick and Glenn H. Dale, Bartlesville, Okla., assignors to Phillips Petroleum Company, a corporation of Delaware
Filed Apr. 30, 1962, Ser. No. 191,133
3 Claims. (Cl. 62—58)

ABSTRACT OF THE DISCLOSURE

An aqueous food product or beverage is distilled to produce a bottoms concentrate and an overhead product. The overhead product is cooled to crystallize water, which is removed from the mother liquor. The remaining mother liquor is then added to the bottoms concentrate to avoid loss of low boiling constituents present in the original food product or beverage.

---

This invention relates to an improved method of and apparatus for concentrating aqueous solutions. In a specific aspect, this invention relates to an improved method of and apparatus for concentrating aqueous solutions which comprises the combining of distillation and crystallization process steps in a unique and novel manner.

It has become highly desirable that economical and effective processes for the concentration of beverages and other aqueous food products be provided. Utilizing these concentration processes, beverages and other aqueous food products can be transferred from the manufacturer to the consumer at a substantial reduction in cost.

It is known that aqueous solutions can be concentrated by, for example, multiple effect evaporation. In the concentration of some products, utilizing heat and/or low pressures to remove water by evaporation, it has been observed that essential ingredients which are relatively volatile are removed with the water vapor and are lost unless subsequently recovered. In the concentration of fruit juices and vegetable juices, for example, the loss of these essential ingredients (oils and esters) results in a concentrated product wherein at least a portion of the original freshness and flavor has been lost in the concentration process.

The recovery of the oils and esters from the vapors withdrawn from an evaporation step can be effected by the partial condensation of the vapors. However, the oils and esters recovered from the partial condensation step are relatively dilute and if they are combined with the main concentrate removed from the evaporation step, undesirable dilution of the main concentrate is the result. Due to the relative volatility of the recovered oils and esters, conventional methods of concentrating the recovered oils and esters prior to recombining said oils and esters with the main concentrate are highly undesirable.

Another advantage of preparing concentrates of aqueous solutions is that said concentrates are generally very stable, are therefore better able to resist oxidative, thermal or other degradation, and can be stored for extensive periods of time without refrigeration. If a concentrate prepared by a process, for example, such as multiple effect evaporation, is subsequently blended with a recovered dilute solution of the previously volatilized essential ingredients, the resulting dilution of the main concentrate can result in the loss of the potential inherent stability of the higher concentration.

Accordingly, an object of our invention is to provide an improved method of and apparatus for concentrating aqueous solutions.

Another object of our invention is to provide a process for concentrating aqueous solutions wherein distillation and crystallization process steps are combined.

Further objects, advantages and features of our invention will be readily apparent to those skilled in the art from the following description and the appended claims.

Broadly, we have discovered a process for the concentration of aqueous solutions which comprises passing an aqueous solution to a distillation zone, withdrawing a concentrated phase from said distillation zone, passing at least a portion of a dilute phase withdrawn from said distillation zone to a crystallization zone, withdrawing a concentrated phase from said crystallization zone, and combining said concentrated phases withdrawn from said distillation and crystallization zones.

Figure 1:
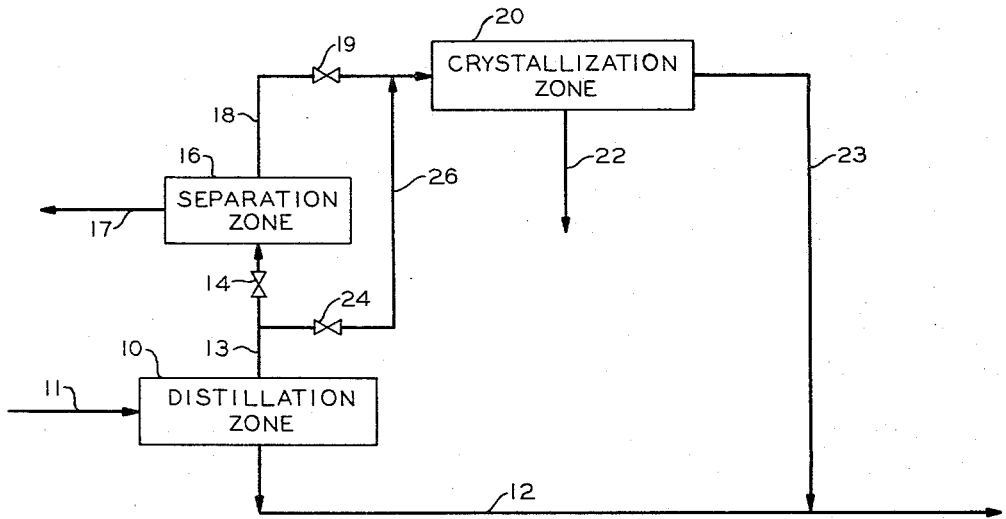
FIGURE 1 is a schematic representation of one embodiment of the inventive process.

Referring to FIGURE 1, an aqueous solution is passed via conduit means 11 to distillation zone 10. The inventive process is particularly adapted to the processing of aqueous food products and beverages such as milk, fruit juices, vegetable juices, vinegar, beer, wine, liquors, and the like. The term "distillation," as herein employed, is defined as the vaporization of a liquid mixture to yield a vapor phase containing at least one constituent. This includes the vaporization of a liquid mixture to yield a vapor phase containing more than one constituent and the vaporization of a liquid mixture to yield a vapor phase containing a single constituent, the first of these processes commonly referred to as evaporation.

Distillation zone 10 is maintained at a temperature and pressure so as to form a concentrated phase and a dilute phase. The concentrated phase comprises a recoverable product in concentrated form whereas the dilute phase comprises a recoverable product and water, said dilute phase recoverable product in dilute form. The concentrated and dilute phases can be either vaporous or liquid, depending upon the aqueous solution passed to distillation zone 10 via conduit means 11. For example, in the concentration of pineapple juice, distillation zone 10 can comprise a means for evaporating the water from the feed mixture. In this case, the concentrated phase would be a liquid phase and the dilute phase would be vaporous and comprised of water vapor, ethyl alcohol and volatile esters.

If the feed mixture passed to distillation zone 10 via conduit means 11 should be beer, the concentrated phase would be vaporous comprising ethyl alcohol and volatile flavor bodies. A dilute liquid phase would comprise sugars, flavor bodies, and water. With beer as a feed mixture to distillation zone 10, it is also within the scope of this invention to prepare a liquid concentrated phase and a dilute vaporous phase comprising ethyl alcohol and water.

The concentrated phase is withdrawn from distillation zone 10 via conduit means 12, and if said concentrated phase is vaporous, said concentrated phase is condensed by means not herein illustrated.

In one embodiment of the inventive process, the dilute phase is withdrawn from distillation zone 10 via conduit means 13 and passed via valve means 14 to a separation zone 16. Within separation zone 16, the feed mixture is separated into a fraction containing substantially all of the recoverable product passed to separation zone 16 via conduit means 13, and into a fraction comprising water. If the feed to distillation zone 10 comprises, for example, a fruit juice, separation zone 16 can comprise a conventional means for fractionally condensing the dilute vaporous phase passed to separation zone 16 via conduit means 13. If the feed to distillation zone 10 comprises, for example, beer, separation zone 16 can comprise a means for fractionally distilling an ethyl alcohol and water feed mixture passed to separation zone 16 via conduit means 13. In the latter case, the vaporous stream withdrawn from distillation zone 10 via conduit 13 would be condensed by a means not herein illustrated.

Water is withdrawn from separation zone 16 via conduit means 17. The fraction containing the recoverable product in a more concentrated form is withdrawn from separation zone 16 via conduit means 18 and passed via valve means 19 to a crystallization zone 20.

It is also within the scope of this invention to pass a dilute phase withdrawn from distillation zone 10 via conduit means 13 directly to crystallization zone 20 via conduit means 26 and valve means 24. In those cases where the dilute phase is vaporous, said dilute phase is condensed prior to passage of the condensed dilute phase to crystallization zone 20.

Crystallization zone 20 comprises a conventional process and apparatus for chilling a liquid feed mixture to form crystals of at least a higher melting component and separating the crystals of the higher melting component from a mother liquor. Suitable crystallization processes which can be employed include processes wherein centrifuges are utilized to separate the mother liquor from the formed crystals; mother liquor is separated from the formed crystals by filtration; and where the total liquid feed mixture to the crystallization zone is frozen and a mother liquor is separated from the crystallized mass by distilling said crystallized mass under a high vacuum. For example, in the patent to Schmidt, Re. 23,810, there is disclosed a process and apparatus for separating crystals from a slurry prepared by chilling a feed mixture which involves moving a mixture of crystals in mother liquor to a purification column in which the crystals are passed in a compact mass toward a body of crystal melt which is displaced back into the crystal mass. The purification column includes an upstream liquid removal zone, a middle reflux zone and a downstream melting zone. Mother liquor is removed from the crystals in the liquid removal zone and the crystals are melted in the melting zone. A portion of the crystal melt is withdrawn from the melting zone and the remainder is forced back into the crystal mass in the reflux zone.

Ice crystals are formed within crystallization zone 20 and are separated from the mother liquor comprising a recoverable product in concentrated form and withdrawn from crystallization 20 via conduit means 22. A mother liquor comprising the recoverable product in concentrated form is withdrawn from crystallization zone 20 via conduit means 23 and combined with the concentrated phase withdrawn from the distillation zone 10.

Figure 2:
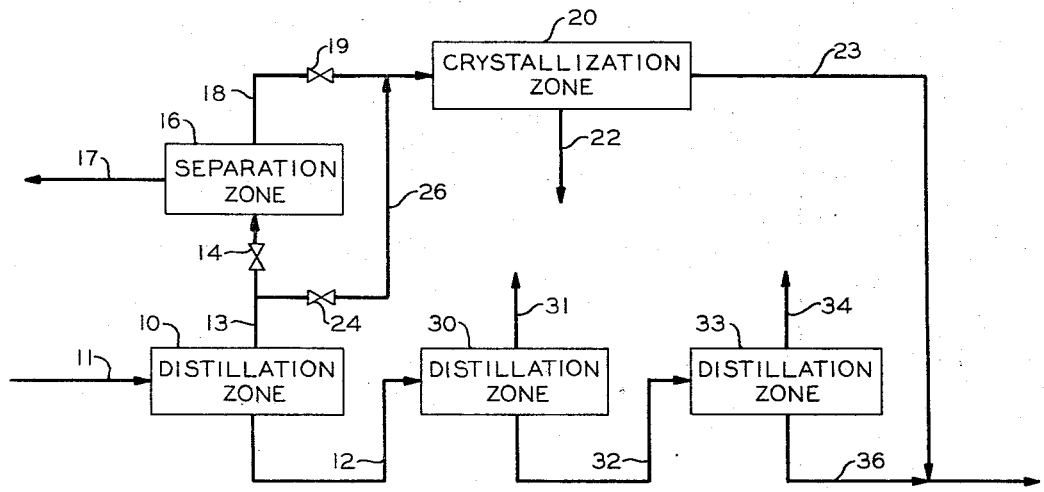
FIGURE 2 is a schematic representation of another embodiment of the inventive process.

It is within the scope of this invention to employ multiple distillation zones. For example, assume that the feed mixture to the distillation zone comprises a fruit juice. Referring to FIGURE 2, there is illustrated a second embodiment of the inventive process employing multiple distillation zones. In this case, distillation zone 10 can comprise a means for evaporation. The vaporous dilute phase withdrawn from distillation zone 10 via conduit means 13 comprises water and a relatively volatile portion of the recoverable concentrated product. A liquid is withdrawn from distillation zone 10 via conduit means 12 and passed to distillation zone 30, said distillation zone 30 comprising a second means for evaporation. Water is withdrawn from distillation zone 30 via conduit means 31. A more concentrated liquid phase is withdrawn from distillation zone 30 via conduit means 32 and passed to distillation zone 33, said distillation zone 33 comprising a third means for evaporaton. A vaporous water phase is withdrawn from distillation zone 33 via conduit means 34 and a concentrated liquid phase is withdrawn from distillation zone 33 via conduit means 35 and combined in heretofore described manner with the concentrated phase withdrawn from crystallization zone 20 via conduit means 23. The remainder of the process of FIGURE 2 is as described in connection with the description of FIGURE 1.

It is also within the scope of this invention to employ multiple crystallization zones with the feed to a second crystallization zone comprising the mother liquor withdrawn from a previous crystallization zone.

By employing the inventive process, the disadvantages of utilizing fractional crystallization to concentrate the feed stream in conduit 11 are eliminated. For example, in the case where a fruit juice comprises the feed stream in conduit 11, an attempt to concentrate by fractional crystallization would result in the crystallization of sugars. These sugars have a tendency to come out of solution upon fractional crystallization. By subjecting only the relatively volatile esters to a crystallization step, the problem of sugars and other components coming out of solution is eliminated.

The following example is presented as illustrative of the inventive process. It is not intended that the invention should be limited thereto.

*Example*

Pineapple juice having the following composition

| | Volume percent |
|---|---|
| Sugars | 14.0 |
| Acid (citric) | 0.8 |
| Pineapple esters (ethyl and methyl esters of acetic, butyric, caproic and caprylic acids) | 2.5 |
| Ethyl alcohol | 1.3 | is passed to distillation zone 10, distillation zone 10 comprising an evaporator maintained at a temperature of 70° F. and a pressure of 0.5 p.s.i.a. A vaporous stream comprising

| | Volume percent |
|---|---|
| Esters | 0.6 |
| Ethyl alcohol | 1.8 |
| Water | 97.6 | is withdrawn from distillation zone 10 via conduit means 13, condensed and passed to crystallization zone 20 via conduit means 26. A liquid stream having a sugar concentration of 20.0 volume percent is withdrawn from distillation zone 10 and passed via conduit means 12 to distillation zone 30.

Distillation zone 30 comprises an evaporator maintained at a temperature of 70° F. and a pressure of 0.5 p.s.i.a. A vaporous stream comprising water is withdrawn from distillation zone 30 via conduit means 31. A liquid stream having a sugar concentration of 32.0 volume percent is withdrawn from distillation zone 30 via conduit means 32 and passed to distillation zone 33.

Distillation zone 33 comprises an evaporator maintained at a temperature of 70° F. and a pressure of 0.5 p.s.i.a. A vaporous stream comprising water is withdrawn from distillation zone 33 via conduit means 34. A liquid concentrate having a sugar concentration of 55.0 volume percent is withdrawn from distillation zone 33 via conduit means 36.

Within crystallization zone 20, the feed mixture is cooled to a temperature of 26° F. in a chilling zone, forming a slurry comprising 35 volume percent ice crystals. The slurry is passed to a purification column, the temperature in the melt zone within the purification column maintained at 75° F. Mother liquor comprising

| | Volume percent |
|---|---|
| Esters | 9.0 |
| Ethyl alcohol | 27.0 |
| Water | 64.0 | is withdrawn from the filter section of the purification column and from crystallization zone 20 via conduit means 23. A portion of the mother liquor withdrawn from the purification column is recycled to the chilling zone, thereby bringing the concentration of esters within the chilling zone to 6–7 volume percent. Melt comprising less than 0.2 volume percent esters and water is withdrawn from crystallization zone 20 via conduit means 22.

The mother liquor withdrawn from crystallization zone 20 and the liquid concentrate withdrawn from distillation zone 33 are combined to yield a concentrated product.

As will be evident to those skilled in the art, various modifications of this invention can be made, or followed, in the light of the foregoing disclosure and discussion without departing from the spirit or scope thereof.

We claim:

1. A process for concentrating an aqueous material selected from the group consisting of foods and beverages, which aqueous material contains at least water, a first constitutent having a boiling point higher than the boiling point of water and a second constituent having a boiling point lower than the boiling point of said first constituent, which process comprises:

distilling in a distillation zone said aqueous material to produce a first aqueous bottoms product having a greater concentration of said first constituent than does said aqueous material and a second vaporous overhead product having a smaller concentration of said first constituent than does said aqueous material and a higher concentration of said second constituent, and cooling said vaporous overhead product to form an aqueous distillate product, passing said distillate product to a crystallization zone to crystallize water contained therein, and separating the remaining mother liquor from the ice crystals so produced; and withdrawing said aqueous bottoms product from said distillation zone, and then combining said separated mother liquor with said withdrawn bottoms product to form a concentrated product.

2. The process of claim 1 wherein said aqueous material is pineapple juice.

3. The process of claim 1 wherein said bottoms product is distilled to remove additional water therefrom before said mother liquor is added thereto.

References Cited

UNITED STATES PATENTS

| | | | |
|---|---|---|---|
| Re. 23,810 | 3/1954 | Schmidt | 99—199 X |
| 981,860 | 1/1911 | Jackson | 99—199 |
| 2,241,726 | 5/1941 | Krause | 99—199 X |
| 2,423,746 | 7/1947 | Zahm | 99—205 |
| 2,465,489 | 3/1949 | Sokol | 203—48 |
| 2,588,337 | 3/1952 | Sperti | 99—205 |
| 3,067,270 | 12/1962 | Weedman | 203—48 |
| 3,121,626 | 2/1964 | Zarchen | 203—48 |
| 3,177,264 | 4/1965 | Buchsbaum | 203—48 |

NORMAN YUDOFF, *Primary Examiner.*

ABRAHAM H. WINKELSTEIN, WILBUR L. BASCOMB, JR., *Examiners.*

R. S. AULL, G. HINES, *Assistant Examiners.*